United States Patent
Mouleeswaran et al.

(10) Patent No.: US 11,467,809 B2
(45) Date of Patent: Oct. 11, 2022

(54) EVALUATION OF JAVASCRIPT OBJECT NOTATION (JSON) QUERIES WITH FIRST-ORDER LOGIC USING CONTEXT-FREE GRAMMAR

(71) Applicant: Palo Alto Networks, Inc., Santa Clara, CA (US)

(72) Inventors: Chandra Biksheswaran Mouleeswaran, Coupertino, CA (US); Kasiviswanathan Annamalai, Santa Clara, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 17/123,662

(22) Filed: Dec. 16, 2020

(65) Prior Publication Data

US 2022/0188082 A1 Jun. 16, 2022

(51) Int. Cl.
  *G06F 8/41* (2018.01)
  *G06F 16/901* (2019.01)
  *G06F 9/54* (2006.01)

(52) U.S. Cl.
  CPC ............ *G06F 8/427* (2013.01); *G06F 9/547* (2013.01); *G06F 16/9027* (2019.01)

(58) Field of Classification Search
  CPC ....... G06F 8/427; G06F 16/9027; G06F 9/547
  USPC .............................. 717/139–148; 77/139–148
  See application file for complete search history.

(56) References Cited

U.S. PATENT DOCUMENTS

| | | | | |
|---|---|---|---|---|
| 5,737,734 A | * | 4/1998 | Schultz | G06F 16/40 707/999.005 |
| 5,812,853 A | * | 9/1998 | Carroll | G06F 8/427 717/108 |
| 6,446,256 B1 | * | 9/2002 | Hyman | G06F 8/447 707/E17.118 |
| 6,714,905 B1 | * | 3/2004 | Chang | G06F 40/211 704/9 |
| 6,745,187 B2 | * | 6/2004 | Singer | G06Q 10/10 707/999.102 |
| 7,027,055 B2 | * | 4/2006 | Anderson | H04L 41/0686 345/473 |
| 7,082,433 B2 | * | 7/2006 | Anonsen | G06F 16/284 |

(Continued)

OTHER PUBLICATIONS

Li et al, "Mison: A Fast JSON Parser for Data Analytics", ACM, pp. 1118-1129 (Year: 2017).*

(Continued)

*Primary Examiner* — Anil Khatri
(74) *Attorney, Agent, or Firm* — Gilliam IP PLLC

(57) ABSTRACT

A JavaScript Object Notation ("JSON") query parser parses cloud database JSON queries with first order logic. A compiler-compiler generates the JSON query parser using a representation of a context-free grammar with first-order logic. An information retrieval model generator generates information retrieval models for cloud resources in the cloud database based on known JSON queries and query responses to the cloud database. The JSON query parser generates parse trees from the JSON queries and identifies cloud resources for the JSON queries. Subsequently, the JSON query parser uses the parse trees to extract JSON object paths from the corresponding information retrieval models and the JSON object paths go into a cloud database query.

20 Claims, 6 Drawing Sheets

(56) References Cited

U.S. PATENT DOCUMENTS

| | | | | |
|---|---|---|---|---|
| 7,089,541 | B2* | 8/2006 | Ungar | G06F 8/427 717/112 |
| 7,127,450 | B1* | 10/2006 | Chang | G06F 16/338 707/999.005 |
| 7,254,808 | B2* | 8/2007 | Trappen | G06F 16/289 717/143 |
| 8,225,408 | B2* | 7/2012 | Rubin | H04L 63/0227 726/25 |
| 8,296,744 | B2* | 10/2012 | Langworthy | G06F 8/43 717/142 |
| 8,478,732 | B1* | 7/2013 | Chang | G06F 16/3334 707/706 |
| 8,640,017 | B1* | 1/2014 | Chang | G06F 16/3344 715/200 |
| 8,918,412 | B1* | 12/2014 | Jesurum | H04L 67/56 707/760 |
| 9,229,993 | B2* | 1/2016 | Odenheimer | G06F 16/25 |
| 10,318,491 | B1* | 6/2019 | Graham | G06F 16/182 |
| 10,521,430 | B1* | 12/2019 | Schreier | G06F 16/24561 |
| 10,726,009 | B2* | 7/2020 | Pal | G06F 16/258 |
| 10,817,490 | B2* | 10/2020 | Li | G06F 40/221 |
| 10,942,910 | B1* | 3/2021 | Certain | G06F 16/2282 |
| 10,942,922 | B2* | 3/2021 | Cummings | G06F 40/211 |
| 11,216,511 | B1* | 1/2022 | Bigdelu | G06F 16/248 |

OTHER PUBLICATIONS

Lisena et al, "Transforming the JSON Output of SPARQL Queries for Linked Data Clients", ACM, pp. 775-779 (Year: 2018).*

Maletti et al, "Parsing Algorithms based on Tree Automata", ACM, pp. 1-12 (Year: 2009).*

Wang et al, "A Syntactic Tree Matching Approach to Finding Similar Questions in Community-based QA Services", ACM, pp. 187-194 (Year: 2009).*

Glasersfeld et al, "The Multistore Parser for Hierarchical Syntactic Structures", ACM, pp. 74-82 (Year: 1970).*

Hiroshi et al, "Efficient sentence retrieval based on syntactic structure", ACM, pp. 399-406 (Year: 2006).*

Seo et al, "Syntactic Graphs: A Representation for the Union of All Ambiguous Parse Trees", ACM, pp. 19-32 (Year: 1989).*

Liu et al, "Query Understanding Enhanced by Hierarchical Parsing Structures", IEEE, pp. 72-77 (Year: 2013).*

Curino, et al., "Relational Cloud: A Database-as-a-Service for the Cloud", 5th Biennial Conference on Innovative Data Systems Research, CIDR 2011, Jan. 9-12, 2011 Asilomar, California, 6 pages.

Curino, et al., "Relational Cloud: The Case for a Database Service", MIT Computer Science and Artificial Intelligence Laboratory Technical Report, Mar. 14, 2010, 6 pages.

Sellami, et al., "Complex Queries Optimization and Evaluation Over Relational and NoSQL Data Stores In Cloud Environments", IEEE Transactions on Big Data, vol. 4, No. 2, pp. 217-230, Jun. 1, 2018, doi: 10.1109/TBDATA.2017.2719054, 14 pages.

Tari, et al., "Incremental Information Extraction Using Relational Databases", IEEE Transactions on Knowledge and Data Engineering, vol. 24, No. 1, pp. 86-99, Jan. 2012, doi: 10.1109/TKDE.2010.214, 14 pages.

Zhu, et al., "Querying Combined Cloud-Based and Relational Databases", 2011 International Conference on Cloud and Service Computing, Hong Kong, 2011, pp. 330-335, doi: 10.1109/CSC.2011.6138543, 6 pages.

* cited by examiner

EVALUATION OF JAVASCRIPT OBJECT NOTATION (JSON) QUERIES WITH FIRST-ORDER LOGIC USING CONTEXT-FREE GRAMMAR

BACKGROUND

This disclosure generally relates to data processing and to database and file access.

JavaScript Object Notation ("JSON" hereinafter) is a standardized file format used to store objects comprising key/value pairs. Keys and values in objects can be numbers, strings, Booleans, or null. Objects are syntactically denoted by a first word in quotation marks, a colon, and a second word in quotation marks. JSON files have a hierarchical tree structure, wherein sub nodes in the tree structure (referred to as "elements" herein) are determined by a colon then a pair of curly brackets after an element identifier which can also be a string, number, or Boolean. JSON further supports arrays of objects and arrays of elements determined by a colon then a pair of straight brackets after an array identifier.

BRIEF DESCRIPTION OF THE DRAWINGS

Aspects of the disclosure may be better understood by referencing the accompanying drawings.

DESCRIPTION

The description that follows includes example systems, methods, techniques, and program flows that embody aspects of the disclosure. However, it is understood that this disclosure may be practiced without these specific details. For instance, this disclosure refers to parsing JSON queries with a JSON query parser using a context-free grammar with first-order logic in illustrative examples. Aspects of this disclosure can be instead applied to parsing queries for any tree structure file format or other file format with a query parser using a context-free grammar. In other instances, well-known instruction instances, protocols, structures and techniques have not been shown in detail in order not to obfuscate the description.

Overview

A cloud database query parser generates cloud resource queries based on JSON queries having first-order logic using information retrieval models of cloud resources. A compiler-compiler generates the cloud database query parser using a configuration file specifying syntax for a context-free grammar with first-order logic. Based on receiving a JSON query with first-order logic, the cloud database query parser determines a cloud resource corresponding to the JSON query. The cloud database query parser then retrieves an information retrieval model for the cloud resource comprising paths to leaves in the tree structure of JSON documents at the cloud resource. The information retrieval model was previously generated based on a database of existing JSON queries and query responses. The cloud database query parser generates a parse tree for the JSON query and uses it to determine JSON object paths from the information retrieval model to include in a query to a cloud database, allowing for handling of complex logical queries for JSON documents in a cloud environment while identifying cloud resources from a potentially obfuscated software as a service cloud database.

Example Illustrations

Figure 1:
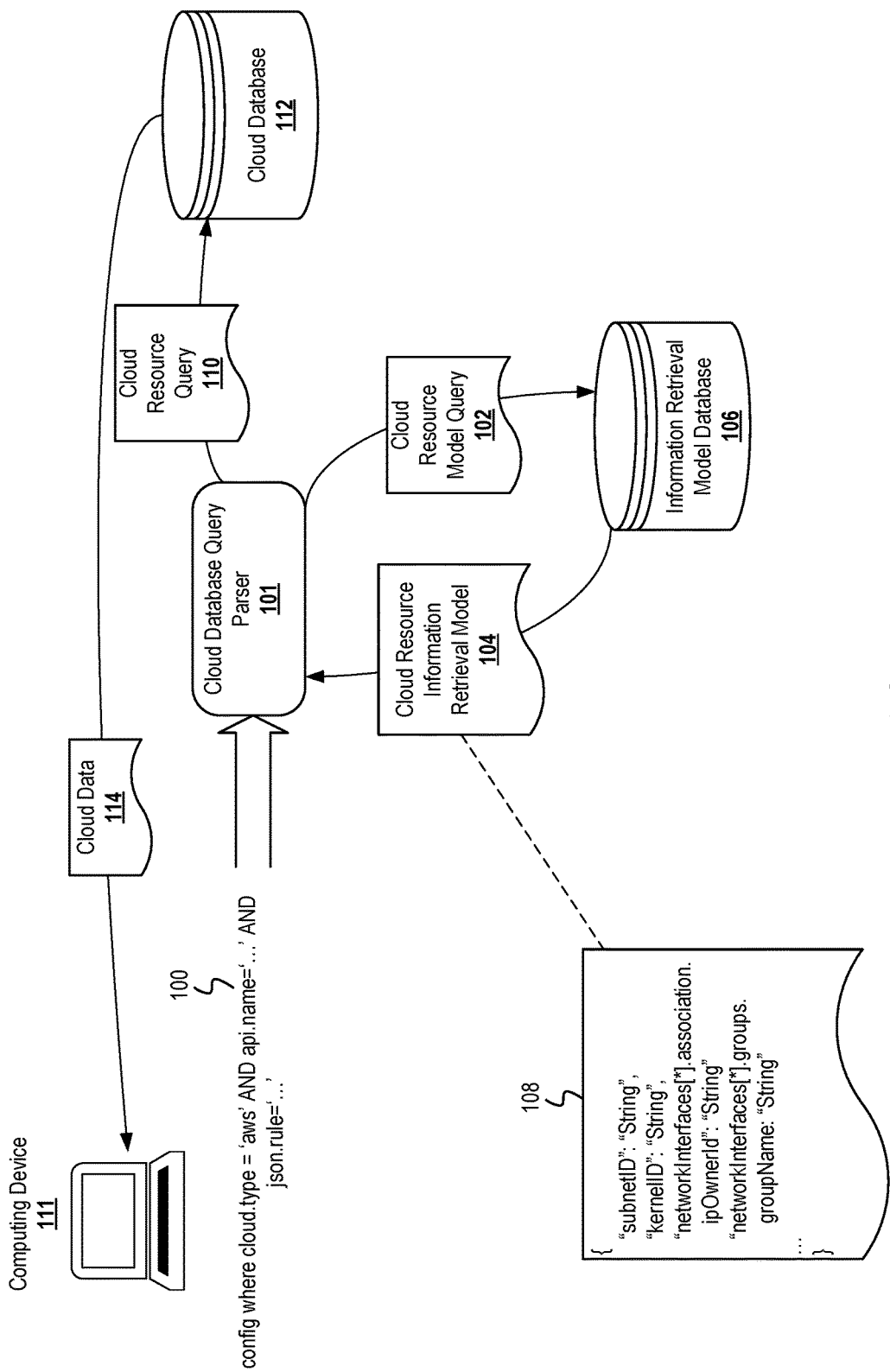
FIG. 1 is a schematic diagram of an example system for parsing a JSON query using information retrieval models for cloud resources.

FIG. 1 is a schematic diagram of an example system for parsing a JSON query using information retrieval models for cloud resources. A cloud database query parser 101 receives an example JSON query 100. The example JSON query 100 is reproduced below:
config where cloud.type='aws' AND api.name=' . . . ' AND json.rule=' . . . '

The example JSON query 100 specifies a cloud type of 'aws' and an application programming interface (hereinafter "API") name and JSON rule that have not been specified. The cloud database query parser 101 can be a parser generated by a compiler-compiler (e.g., ANother Tool for Language Recognition) to parse first-order logic in JSON queries that can include external function calls.

The cloud database query parser 101 creates a parse tree corresponding to the example JSON query 100 (see FIG. 2 for an example parse tree) and determines one or more cloud resources associated with the example JSON query 100. For instance, the cloud database query parser 101 can determine one or more cloud resources associated with the API name in the example JSON query 100. The cloud database query parser 101 communicates indications of the one or more cloud resources in the example JSON query 100 to an information retrieval model database 106. The information retrieval model database 106 retrieves one or more information retrieval models corresponding to a cloud resource model query 102 and communicates them in cloud resource information retrieval model(s) 104. An example cloud resource information retrieval model 108 comprises at least the following fields:
"subnetID": "String",
"kernelID": "String",
"networkInterfaces[*].association.ipOwnerId": "String"
"networkInterfaces[*].groups.groupName: "String"
Each of the fields specifies a path to a leaf in the tree structure of a JSON file for the cloud resource and the file type for that leaf. For instance, networkInterfaces[*] is an array with child association and association has child ipOwnerId which is a string. Although depicted as strings, leaves can have Boolean or integer file types. The information retrieval model database 106 can dynamically maintain and update information retrieval models for cloud resources based on results of JSON queries sent to a cloud database 112.

The cloud database query parser 101 uses a parse tree generated for the example JSON query 100 on the cloud resource information retrieval model(s) 104 to generate a cloud resource query 110. To exemplify, assume the example JSON query is:
config where json.rule=path[?(subnetID)].val
The corresponding parse tree can be a rule to retrieve values at a path with identifier "subnetID". The cloud database query parser 101 can then check each of the fields of the cloud resource information retrieval model(s) 104 for the path identifier "subnetID" and generate the cloud resource query 110 as a cloud query that queries each of these paths. Because the cloud resource information retrieval model(s) 104 has possible paths in a cloud resource(s) instead of a tree structure for paths of the cloud resource(s), the cloud database query parser 101 is able to handle nested JSON query rules that specify rules with first-order logical structures. For instance, the cloud database query parser 101 is able to parse a JSON query such as:

config where json.rule=path[?any (val is false and (x is true or y equal str))] exists In the above JSON query, the syntax "any( )" verifies all entries in the path against the rule "val is false and (x is true or y equal str)". The expression inside of path[ ] can be extended to any first-order logical expression including external function calls.

The cloud database 112 receives the cloud resource query 110 from the cloud database query parser 101 and retrieves corresponding cloud data 114 that the cloud database 122 communicates to a computing device 111. The cloud database 112 can be an external cloud database provided as a software-as-a-service cloud database. Thus, cloud resources on the cloud database 112 can be across a wide variety of servers, locations, etc. Information retrieval models in the information retrieval model database 106 can be maintained based on JSON queries to the cloud database 112 across a business enterprise, tracking the locations of queries to each cloud resource when updating an information retrieval model for that resource.

Figure 2:
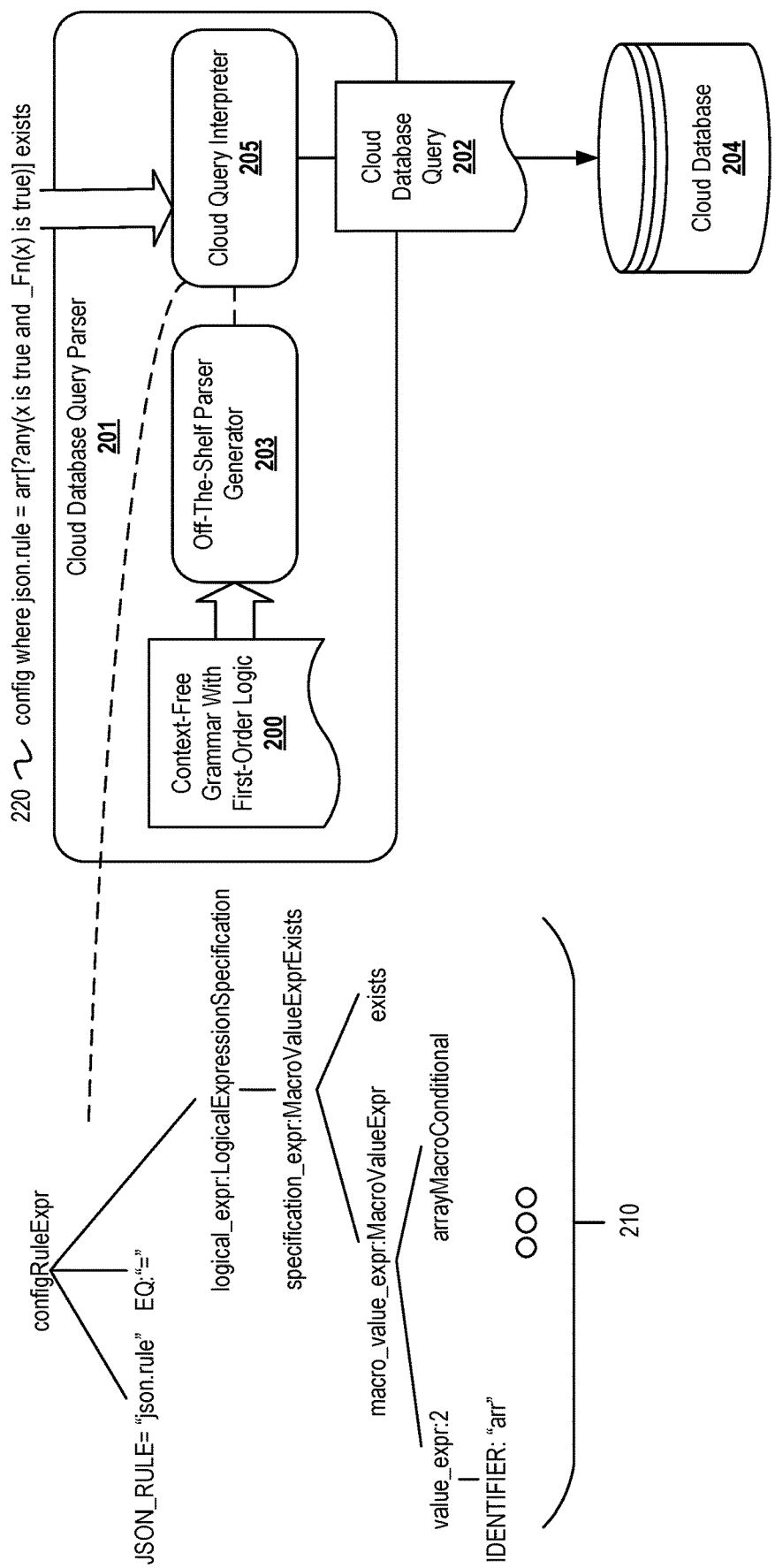
FIG. 2 is a schematic diagram of a cloud database query parser generating a parse tree to parse an example JSON query to a cloud database.

FIG. 2 is a schematic diagram of a cloud database query parser generating a parse tree to parse an example JSON query to a cloud database. A cloud database query parser 201 comprises an off-the-shelf parser generator 203 that uses as input a context-free grammar with first-order logic 200 to output a cloud query interpreter 205. The context-free grammar with first-order logic 200 specifies a grammar with which to parse JSON queries according to first-order logical rules. Example grammatical rules and corresponding descriptions are in the table below.

| First-Order Grammatical Rule | Explanation |
| --- | --- |
| ?any(a and b and c) | Are any of a, b, and c are true |
| A[a is member of (b, c, d)] | Is the value of the a element of the array A a member of the set {b, c, d} |
| a.b[?all(x or (y and z))].exists | Does the element b in path a contain an element that is either x or y and z. |

The above grammatical rules specify a particular syntactical structure for first-order logic. Other notational conventions, as specified by the context-free grammar with first-order logic 200, can be implemented. Any logical connectives, quantifiers, variable names, etc. can be used in addition to those disclosed herein.

The off-the-shelf parser generator 203 can be any stand-alone compiler-compiler that takes context-free grammars such as the context-free grammar with first-order logic 200. The context-free grammar with first-order logic 200 can specify syntax and grammatical rules in configuration files that are used as input to the off-the-shelf parser generator 203. The off-the-shelf parser generator 203 can be any compiler-compiler that can generate a parser generator based on a context-free grammar (e.g., ANother Tool for Language Recognition).

The cloud query interpreter 205 takes an example JSON rule 220 as input and generates a parse tree 210 corresponding to the syntactic structure of the example JSON rule 220 copied below:

config where json.rule=arr[?any(x is true and _Fn(x) is true)] exists

This example JSON rule checks whether the array "arr" contains an element such that x is true and _Fn(x) is true, where _Fn(x) is an external function. For example, _Fn(x) can be an external function that specifies x has a time stamp within a specific time range. The top level of the parse tree 210 specifies a configuration rule expression "configRuleExpr" with JSON rule "json.rule", an equation for the configuration rule expression with "=," and a logical expression "logical_expr:LogicalExpressionSpecification" corresponding to the configuration rule expression "configRuleExpr". Below the logical expression "logical_expr:LogicalExpressionSpecification", there is a macro value expression (i.e., the array condition) "specification_expr:MacroValueExprExists" that the macro value condition for the array exists. Below, there is a node for the macro value expression "macro_value_expr:MacroValueExpr" and a node that specifies the macro value expression corresponds to "exists". The macro value expression "macro_value_expr:MacroValueExpr" comprises an array macro conditional "arrayMacroConditional" corresponding to the array with identifier "value_expr:2" that is clarified as corresponding to "IDENTIFIER: arr" in the sub node. Additional sub trees specifying the "?any(x is true and _Fn(x) is true)" array macro conditional are omitted for brevity.

The parse tree 210 can be any syntactical structure that allows the cloud query interpreter 205 to formulate first-order logic rules for the context-free grammar with first-order logic. The cloud query interpreter 205 uses the parse tree 210 or other syntactical structure to determine JSON object paths for a cloud resource based on an information retrieval model for the cloud resource (not shown). The cloud query interpreter 205 then generates a cloud database query 202 to query a cloud database 204 for the JSON object paths. The cloud database query 202 can comprise identifiers for the cloud resource associated with the JSON data object paths as well as the JSON object paths themselves.

Figure 3:
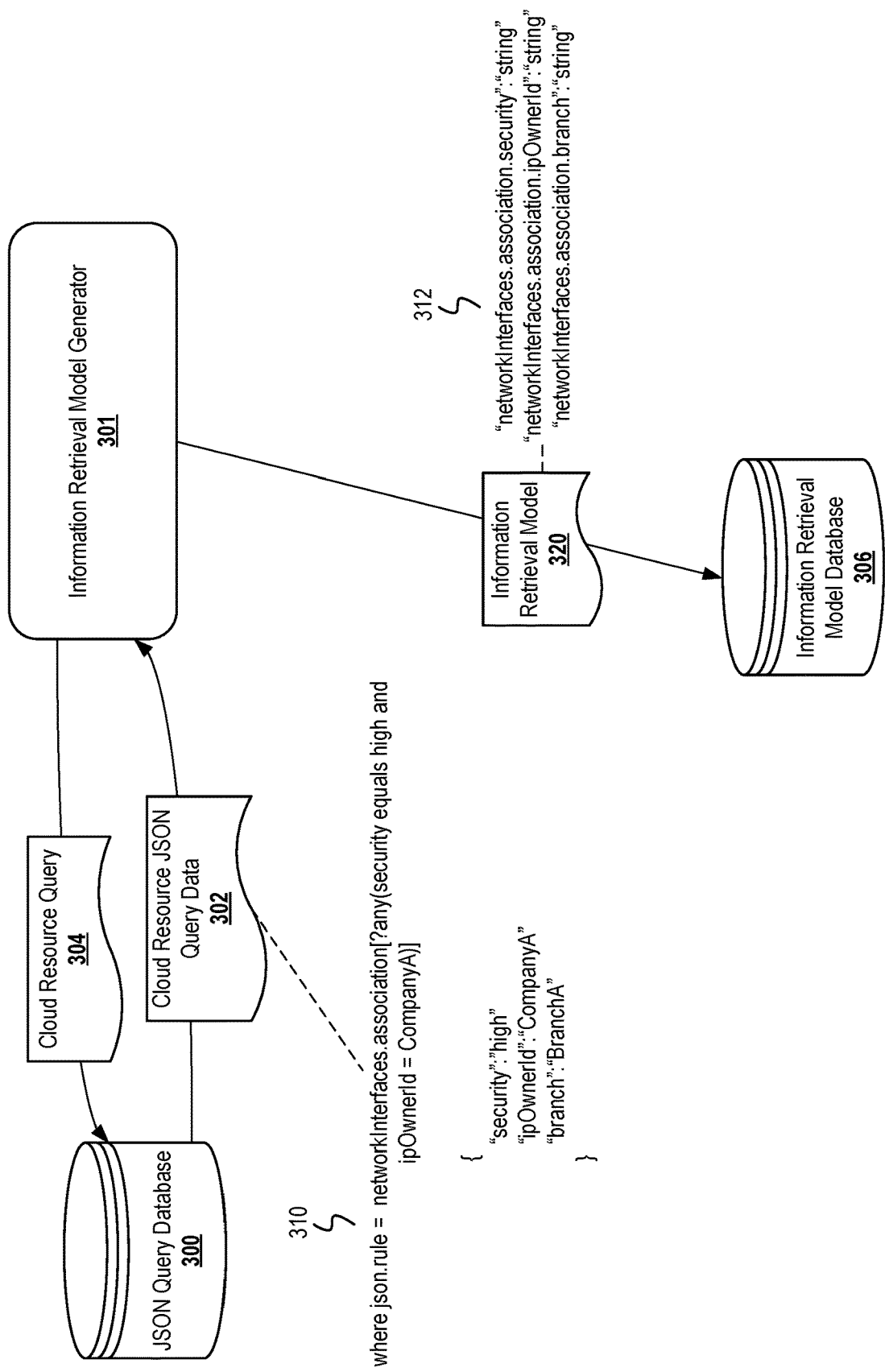
FIG. 3 is a schematic diagram of an information retrieval model generator for cloud resources.

FIG. 3 is a schematic diagram of an information retrieval model generator for cloud resources. An information retrieval model generator 301 communicates a cloud resource query 304 to a JSON query database 300. The cloud resource query 304 comprises one or more identifiers for a cloud resource such as a region, a server, an identifier number, etc. The JSON query database 300 retrieves all JSON queries and query responses to the cloud resource indicated in the cloud resource query 304 and stores them in cloud resource JSON query data 302. An example JSON query data 310 comprises a JSON query as follows:

config where json.rule=networkInterfaces.association[?any (security equals high and ipOwnerId=CompanyA)]

and a corresponding query response:

{
 "security": "high"
 "ipOwnerId": "CompanyA"
 "branch": "BranchA"
}

The example JSON query comprises a JSON rule that searches for elements in the JSON tree structure of the cloud resource below the networkInterfaces.association element comprising a security object with string value "high" and an ipOwnerId object with string value "CompanyA". The corresponding query response indicates that such an element exists with an additional object "branch": "BranchA". The cloud resource JSON query data 302 can comprise multiple JSON queries and query responses accumulated over a lifetime of interactions with a cloud service. The JSON queries can include previous JSON queries not having first-order logic functionalities enabled by the present disclosure. As such, information retrieval models can be built for cloud resources without having access to a JSON query parser using a context-free gramma with first-order logic.

The information retrieval model generator 301 receives the cloud resource JSON query data 302 and identifies JSON object paths. The JSON object paths are derived from both the JSON query and the query response. The JSON query can indicate an upper structure of JSON object paths while the query response can indicate leaves or lower structures for the JSON object path. For instance, in the example JSON query data 310, the JSON query indicates an upper JSON object path of networkInterfaces.association, while the query response indicates leaves of "security": "string", "ipOwnerId": "CompanyA", and "branch": "BranchA" (the first two leaves are also indicated in the JSON query). Thus, an example information retrieval model 312 includes the following JSON object paths:
"networkInterfaces.association.security": "string"
"networkInterfaces.association.ipOwnerId": "string"
"networkInterfaces.association.branch": "string"
Multiple upper JSON object paths can be indicated in the same JSON query. Query responses in the cloud resource JSON query data 302 can indicate full paths for the leaf objects so that the JSON object path for each leaf object in query responses is known. The information retrieval model generator 301 stores the identified object paths in an information retrieval model 320 which is stored in an information retrieval model database 306.

Figure 4:
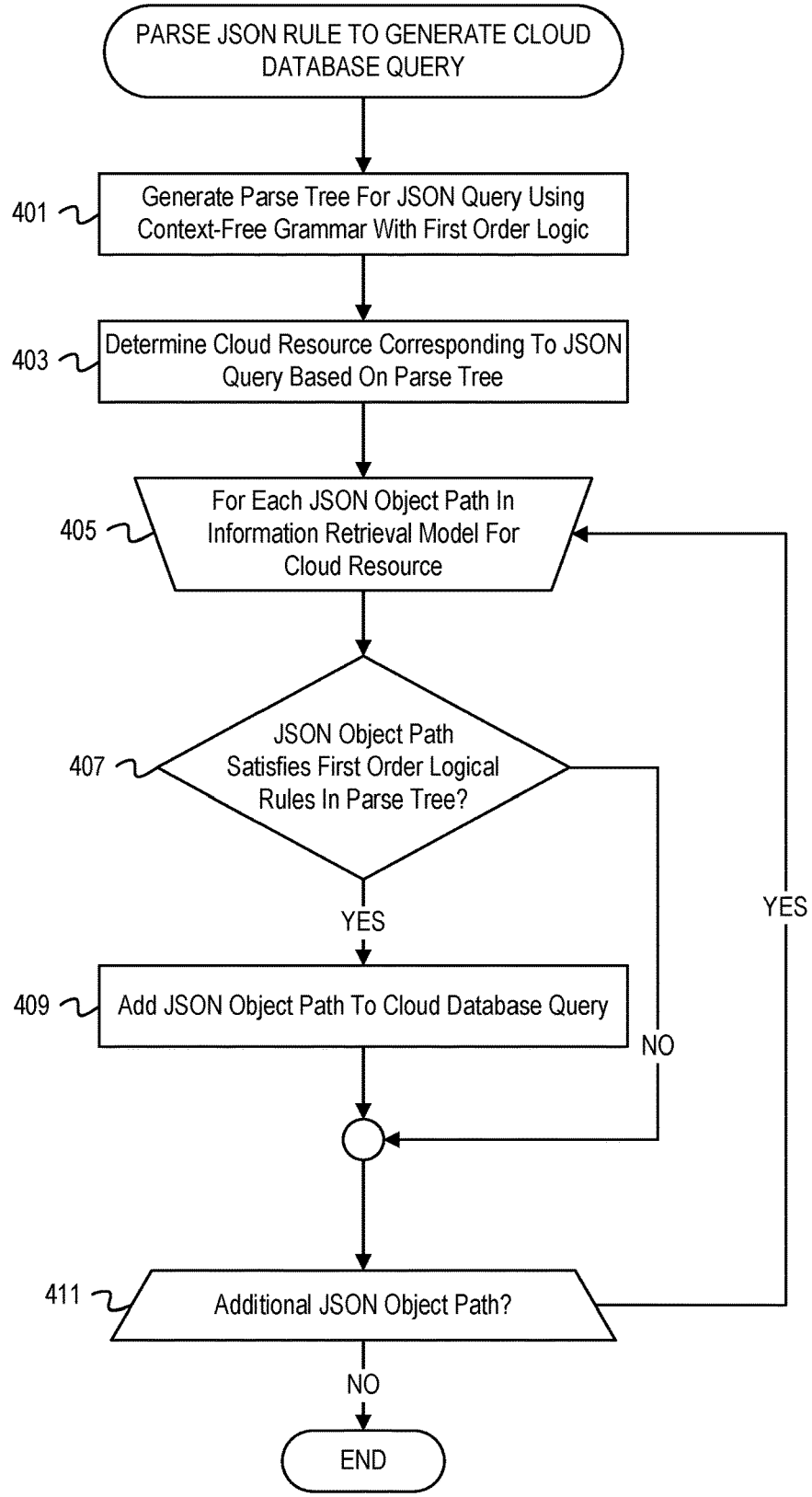
FIG. 4 is a flowchart of example operations for parsing a JSON query to generate a cloud database query.
Figure 5:
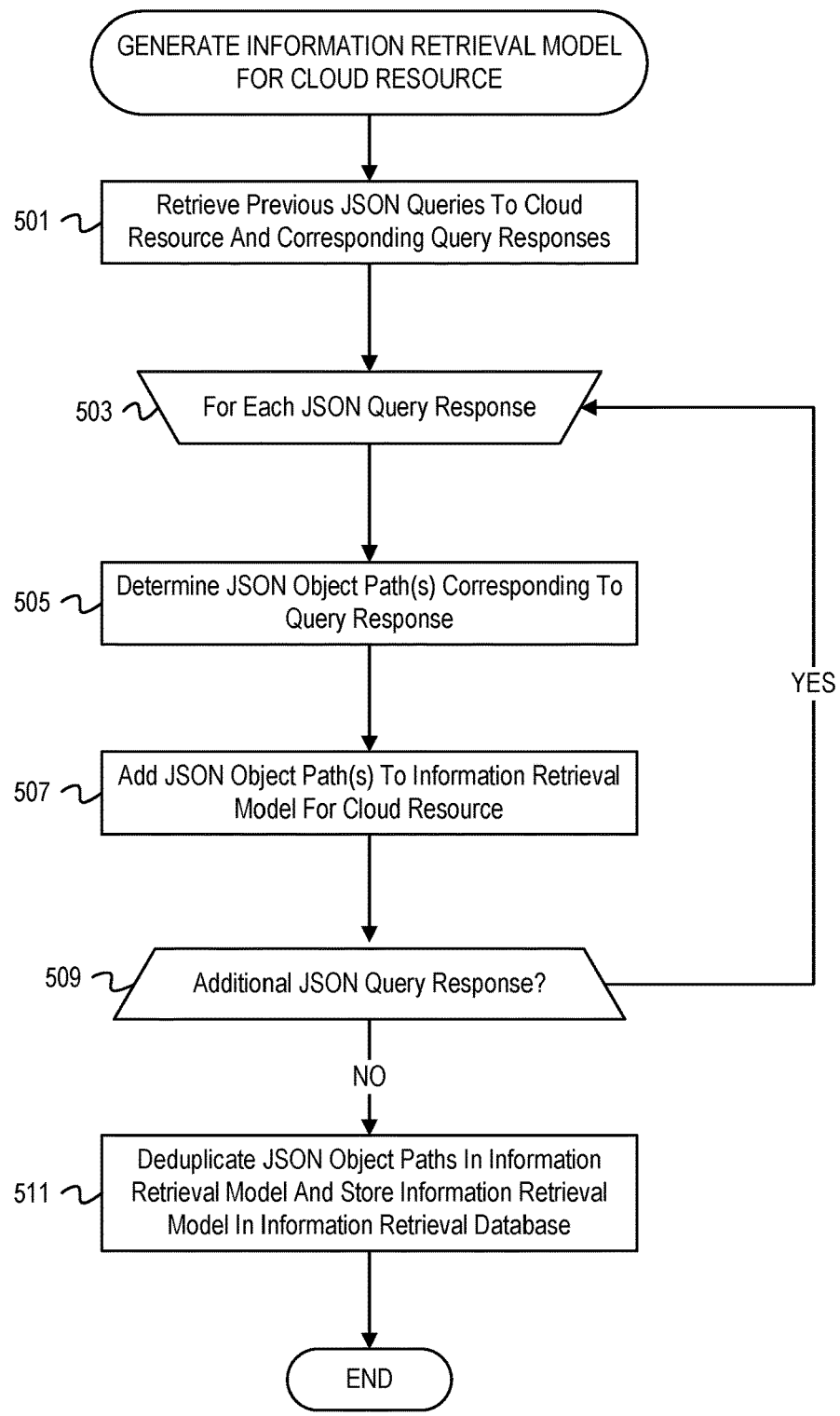
FIG. 5 is a flowchart of example operations for generating an information retrieval model for a cloud resource.

The example operations in FIGS. 4 and 5 are described with reference to a JSON query parser and an information retrieval model generator for consistency with the earlier figures. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 4 is a flowchart of example operations for parsing a JSON query to generate a cloud database query. At block 401, a JSON query parser generates a parse tree for a JSON query using context-free grammar with first-order logic. The JSON query parser can be generated by a compiler-compiler using a representation of the context-free grammar with first-order logic as input. The parse tree is an ordered, rooted tree that represents the syntactic structure of the JSON query. Although described as a parse tree, the JSON query parser can generate any syntactic structure that represents the JSON query according to the context-free grammar with first-order logic and allows the JSON query parser to identify JSON object paths corresponding to the JSON query using an information retrieval model.

At block 403, the JSON query parser identifies a cloud resource corresponding to the JSON query based on the parse tree. The JSON query parser can include a deterministic finite automaton (DFA) with states corresponding to available cloud resources, an alphabet corresponding to elements in JSON object paths for the JSON query, and accept states corresponding to whether the JSON object path exists at the current cloud resource. The JSON query can input JSON object paths indicated in the parse tree into the DFA and can see whether the DFA enters an accept state, at which point the JSON query parser can identify the current state as the cloud resource. Other identifiers given in the JSON query, including a cloud type and API name, can be used to further narrow the set of possible cloud resources corresponding to the JSON query.

At block 405, the JSON query parser begins iterating through JSON object paths in an information retrieval for the identified cloud resource. The operations at each iteration are described at blocks 407 and 409.

At block 407, the JSON query parser determines whether the current JSON object path satisfies first-order logical rules in the parse tree. The JSON query parser can be generated as source code by a compiler-compiler (e.g. ANTLR) to handle generating parse tree and evaluating JSON object paths according to the context-free grammar with first-order logic. If the JSON object path satisfies the first-order logical rules in the parse tree, operations continue to block 409. Otherwise, operations skip to block 411.

At block 409, the JSON query parser adds the current JSON object path to a cloud database query. The JSON query parser can convert the JSON object path into a cloud database query using an API for the cloud database. For instance, the JSON query parser can convert the JSON object path into a query for the API of Amazon Web Services® cloud database service. Other APIs corresponding to other cloud database software as a service or native cloud database APIs can be used.

At block 411, the JSON query parser determines whether there is an additional JSON object path. If an additional JSON object path exists, operations return to block 405. Otherwise, the operations in FIG. 4 are complete.

FIG. 5 is a flowchart of example operations for generating an information retrieval model for a cloud resource. At block 501, an information retrieval model generator retrieves previous JSON queries to a cloud resource and corresponding query responses. The JSON queries can be previous JSON queries by a business entity that are stored in a database. In some embodiments, when the cloud database is a software as a service, the JSON queries and query responses can be the only information available to generate an information retrieval model for the cloud resource.

At block 503, the information retrieval model generator begins iterating through JSON query responses. Example operations at each iteration are described at blocks 505 and 507.

At block 505, the information retrieval model generator determines one or more JSON object paths corresponding to the current JSON query response. The information retrieval model generator can parse a JSON file in the JSON query response to determine a file path. For instance, the information retrieval model generator can replace a pair of curly brackets around JSON objects or sets of JSON objects with a period indicating a branch in the JSON object path. The JSON query response can correspond to more than one JSON object path. For instance, the JSON query response can comprise multiple JSON files or the JSON file can have multiple paths and/or leaf objects. The information retrieval model generator can be configured to detect the tree structure of the JSON query response and determine multiple JSON object paths therein.

At block 507, the information retrieval model generator adds the JSON object path(s) to the information retrieval model for the cloud resource. The information retrieval model generator can determine an object type for each JSON object path (e.g., string, number, Boolean) and can indicate the object type for each object path in place of the value in the object. The JSON object path(s) can be stored as a list instead of as having a tree structure to facilitate parsing with a parse tree.

At block 509, the information retrieval model generator determines if there is an additional JSON object path. If an additional JSON object path exists, operations return to block 503. Otherwise, operations continue to block 511.

At block 511, the information retrieval model generator deduplicates JSON object paths in the information retrieval model and stores the information retrieval model in an information retrieval model database. The deduplication can occur post-process or in-line as the information retrieval model generator determines JSON object path(s) to add the information retrieval model. Additionally, the JSON object path(s) can be added to the information retrieval model in-line as the JSON object paths are determined iteratively from query responses.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 503, 505, 507, and 509 can be performed in parallel or concurrently. With respect to FIG. 5, deduplicating the JSON object paths in the information retrieval model is not necessary. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python®; a scripting language such as Perl programming language or PowerShell® script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 6:
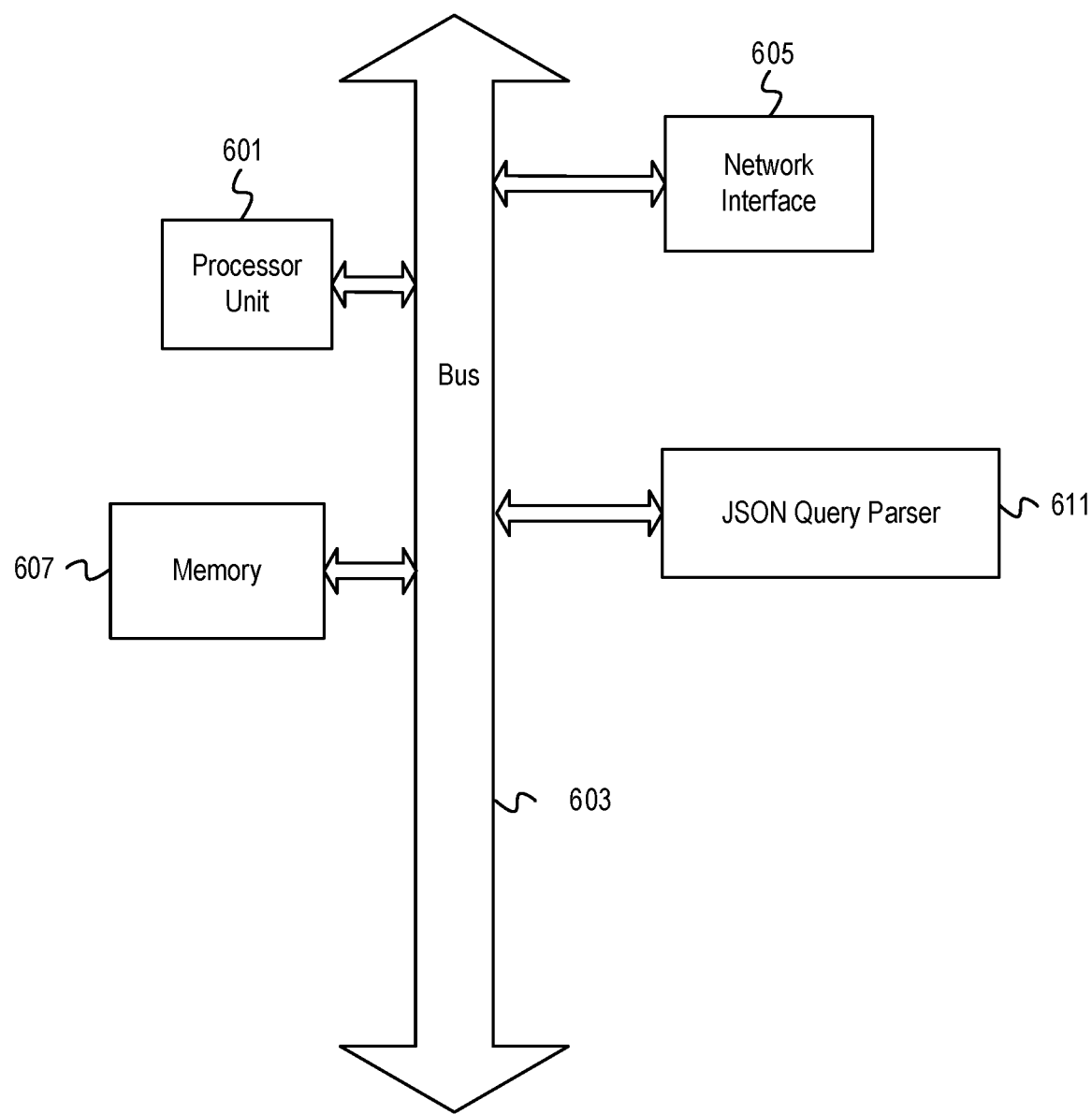
FIG. 6 depicts an example computer system with JSON query parser.

FIG. 6 depicts an example computer system with JSON query parser. The computer system includes a processor 601 (possibly including multiple processors, multiple cores, multiple nodes, and/or implementing multi-threading, etc.). The computer system includes memory 607. The memory 607 may be system memory or any one or more of the above already described possible realizations of machine-readable media. The computer system also includes a bus 603 and a network interface 605. The system also includes a JSON query parser 611. The JSON query parser 611 can parse JSON queries having first-order logic using information retrieval models for cloud resources corresponding to the JSON queries as described variously above. Any one of the previously described functionalities may be partially (or entirely) implemented in hardware and/or on the processor 601. For example, the functionality may be implemented with an application specific integrated circuit, in logic implemented in the processor 601, in a co-processor on a peripheral device or card, etc. Further, realizations may include fewer or additional components not illustrated in FIG. 6 (e.g., video cards, audio cards, additional network interfaces, peripheral devices, etc.). The processor 601 and the network interface 605 are coupled to the bus 603. Although illustrated as being coupled to the bus 603, the memory 607 may be coupled to the processor 601.

While the aspects of the disclosure are described with reference to various implementations and exploitations, it will be understood that these aspects are illustrative and that the scope of the claims is not limited to them. In general, techniques for parsing JSON queries using a JSON query parser generated by a compiler-compiler with a context-free grammar having first-order logic and information retrieval models for cloud resources as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Terminology

This description uses shorthand terms related to cloud technology for efficiency and ease of explanation. When referring to "a cloud," this description is referring to the resources of a cloud service provider. For instance, a cloud can encompass the servers, virtual machines, and storage devices of a cloud service provider. The term "cloud destination" and "cloud source" refer to an entity that has a network address that can be used as an endpoint for a network connection. The entity may be a physical device (e.g., a server) or may be a virtual entity (e.g., virtual server or virtual storage device). In more general terms, a cloud service provider resource accessible to customers is a resource owned/manage by the cloud service provider entity that is accessible via network connections. Often, the access is in accordance with an application programming interface or software development kit provided by the cloud service provider.

The use of "element" herein refers to a sub-tree of the tree structure of a JSON file. Thus, "element" can refer to an object, an array, an array of objects, a set of objects or arrays identified by a string, Boolean, or number, a superset of sets of objects or arrays identified by a string, Boolean, or number, and any combination thereof.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method comprising:
generating a syntactic structure for a tree structure file format query, wherein generating the syntactic structure for the tree structure file format query comprises parsing the tree structure file format query to extract the syntactic structure for the tree structure file format query based on a context-free grammar with first-order logic associated with the tree structure file format query;
identifying a first cloud resource corresponding to the tree structure file format query based, at least in part, on the syntactic structure for the tree structure file format query;
determining a first plurality of object paths in an information retrieval model for the first cloud resource based, at least in part, on the syntactic structure for the tree structure file format query; and
querying a cloud database using at least the first plurality of object paths.

2. The method of claim 1 further comprising,
determining a plurality of object paths for the first cloud resource based, at least in part, on a first plurality of tree structure file format queries and a first plurality of tree structure file format query responses for the first cloud resource; and
generating the information retrieval model for the first cloud resource based, at least in part, on the plurality of object paths.

3. The method of claim 2, further comprising updating the information retrieval model for the first cloud resource based, at least in part, on a second plurality of tree structure file format queries and a second plurality of tree structure file format query responses for the first cloud resource.

4. The method of claim 1, wherein querying the cloud database using at least the first plurality of object paths comprises converting the first plurality of object paths into queries for an application programming interface of the cloud database.

5. The method of claim 1, wherein determining the first cloud resource corresponding to the tree structure file format query comprises,
inputting a representation of the tree structure file format query into a deterministic finite automaton (DFA) having states that are cloud resources; and
determining that the DFA enters an accept state corresponding to the first cloud resource.

6. The method of claim 1, wherein the syntactic structure for the tree structure file format query is a parse tree for the tree structure file format query.

7. The method of claim 1, further comprising generating a query parser with a compiler-compiler, wherein parsing the tree structure file format query is by the generated query parser.

8. The method of claim 7, wherein generating the query parser comprises inputting a representation of the context-free grammar with first-order logic into the compiler-compiler.

9. One or more non-transitory machine-readable media comprising program code to:
generate a syntactic structure for a tree structure file format query, wherein the program code to generate the syntactic structure for the tree structure file format query comprises program code to parse the tree structure file format query to extract the syntactic structure for the tree structure file format query based on a context-free grammar with first-order logic associated with the tree structure file format query;
identify a first cloud resource corresponding to the tree structure file format query based, at least in part, on the syntactic structure for the tree structure file format query;
determine a first plurality of object paths in an information retrieval model for the first cloud resource based, at least in part, on the syntactic structure for the tree structure file format query; and query a cloud database using at least the first plurality of object paths.

10. The non-transitory machine-readable media of claim 9 further comprising program code to,
   determine a plurality of object paths for the first cloud resource based, at least in part, on a first plurality of tree structure file format queries and a first plurality of tree structure file format query responses for the first cloud resource; and
   generate the information retrieval model for the first cloud resource based, at least in part, on the plurality of object paths.

11. The non-transitory machine-readable media of claim 10 further comprising program code to update the information retrieval model for the first cloud resource based, at least in part, on a second plurality of tree structure file format queries and a second plurality of tree structure file format query responses for the first cloud resource.

12. The non-transitory machine-readable media of claim 9 wherein the program code to query the cloud database using at least the first plurality of object paths comprises program code to convert the first plurality of object paths into queries for an application programming interface of the cloud database.

13. The non-transitory machine-readable media of claim 9, wherein the program code to determine the first cloud resource corresponding to the tree structure file format query comprises program code to,
   input a representation of the tree structure file format query into a deterministic finite automaton (DFA) having states that are cloud resources; and
   determine that the DFA enters an accept state corresponding to the first cloud resource.

14. The non-transitory machine-readable media of claim 9, wherein the syntactic structure for the tree structure file format query is a parse tree for the tree structure file format.

15. The non-transitory machine-readable media of claim 9 further comprising program code to generate a query parser with a compiler-compiler, wherein the program code to parse the tree structure file format query is by the generated query parser.

16. The non-transitory machine-readable media of claim 15, wherein the program code to generate the query parser comprises program code to input a representation of the context-free grammar with first-order logic into the compiler-compiler.

17. An apparatus comprising:
   a processor; and
   a machine-readable medium having program code executable by the processor to cause the apparatus to,
      generate a syntactic structure for a tree structure file format query, wherein the program code executable by the processor to cause the apparatus to generate the syntactic structure for the tree structure file format query comprises program code to parse the tree structure file format query to extract the syntactic structure for the tree structure file format query based on a context-free grammar with first-order logic associated with the tree structure file format query;
      identify a first cloud resource corresponding to the tree structure file format query based, at least in part, on the syntactic structure for the tree structure file format query;
      determine a first plurality of object paths in an information retrieval model for the first cloud resource based, at least in part, on the syntactic structure for the tree structure file format query; and
      query a cloud database using at least the first plurality of object paths.

18. The apparatus of claim 17 further comprising program code executable by the processor to cause the apparatus to,
   determine a plurality of object paths for the first cloud resource based, at least in part, on a first plurality of tree structure file format queries and a first plurality of tree structure file format query responses for the first cloud resource; and
   generate the information retrieval model for the first cloud resource based, at least in part, on the plurality of object paths.

19. The apparatus of claim 18 further comprising program code executable by the processor to cause the apparatus to update the information retrieval model for the first cloud resource based, at least in part, on a second plurality of tree structure file format queries and a second plurality of tree structure file format query responses for the first cloud resource.

20. The apparatus of claim 17, wherein the program code executable by the processor to cause the apparatus to query the cloud database using at least the first plurality of object paths comprises program code executable by the processor to cause the apparatus to convert the first plurality of object paths into queries for an application programming interface of the cloud database.

* * * * *